(12) United States Patent
Lewis et al.

(10) Patent No.: US 9,233,856 B2
(45) Date of Patent: Jan. 12, 2016

(54) USE OF ZEOLITIC MATERIALS FOR REMOVING MERCURY (+2) IONS FROM LIQUID STREAMS

(71) Applicant: UOP LLC, Des Plaines, IL (US)

(72) Inventors: Gregory J. Lewis, Santa Cruz, CA (US); Paulina Jakubczak, Elk Grove Village, IL (US); Julio C. Marte, Carol Stream, IL (US); Susan C. Koster, Carpentersville, IL (US); Mark A. Miller, Niles, IL (US); Lisa M. Knight, Chicago, IL (US); Jaime G. Moscoso, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 164 days.

(21) Appl. No.: 14/186,741

(22) Filed: Feb. 21, 2014

(65) Prior Publication Data

US 2014/0311986 A1  Oct. 23, 2014

Related U.S. Application Data

(60) Provisional application No. 61/814,204, filed on Apr. 20, 2013.

(51) Int. Cl.
*C02F 1/42* (2006.01)
*C02F 1/28* (2006.01)
*B01J 20/18* (2006.01)
*C02F 101/20* (2006.01)

(52) U.S. Cl.
CPC .............. *C02F 1/281* (2013.01); *B01J 20/186* (2013.01); *C02F 2001/425* (2013.01); *C02F 2101/20* (2013.01)

(58) Field of Classification Search
CPC ...... C02F 1/42; C02F 1/281; C02F 2001/425; C02F 2101/20; B01J 20/186
USPC ................................................... 210/688, 914
See application file for complete search history.

(56) References Cited

U.S. PATENT DOCUMENTS

| 3,033,641 | A | * | 5/1962 | Thomas, Jr. | ............. | B01J 39/02 |
| | | | | | | 210/681 |
| 6,713,041 | B1 | * | 3/2004 | Moscoso | .................. | B01J 29/70 |
| | | | | | | 423/705 |

* cited by examiner

*Primary Examiner* — Matthew O Savage

(57) ABSTRACT

A process for removing $Hg^{2+}$ ions from a liquid stream is disclosed. The process involves contacting the liquid stream with specified UOP Zeolitic Materials. These molecular sieves are particularly effective in removing $Hg^{2+}$ ions from aqueous streams even in the presence of $Mg^{2+}$ and $Ca^{2+}$ ions. The effective molecular sieves have an intermediate range of Si/Al ratios between about 2 and 20 and preferably between 3 and 10.

10 Claims, No Drawings

USE OF ZEOLITIC MATERIALS FOR REMOVING MERCURY (+2) IONS FROM LIQUID STREAMS

CROSS-REFERENCE TO RELATED APPLICATION

This application claims priority from Provisional Application No. 61/814,204 filed Apr. 20, 2013, the contents of which are hereby incorporated by reference.

FIELD OF THE INVENTION

This invention relates to a process for removing contaminant mercury ions from liquid streams, especially aqueous streams, using zeolitic materials.

BACKGROUND OF THE INVENTION

Zeolites are crystalline aluminosilicate compositions which are microporous and which are formed from corner sharing $AlO_2^-$ and $SiO_2$ tetrahedra. Numerous zeolites, both naturally occurring and synthetically prepared are used in various industrial processes. Synthetic zeolites are prepared via hydrothermal synthesis employing suitable sources of Si, Al and structure directing agents such as alkali metals, alkaline earth metals, amines, or organoammonium cations. The structure directing agents reside in the pores of the zeolite and are largely responsible for the particular structure that is ultimately formed. These species balance the framework charge associated with aluminum and can also serve as space fillers. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. Zeolites can be used as catalysts for hydrocarbon conversion reactions Ideally, zeolites can be represented on an anhydrous basis, by the empirical formula

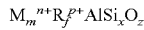

$$M_m^{n+}R_r^{p+}AlSi_xO_z$$

where "M" is at least one metal cation having the weighted average valence "n", "m" is the mole ratio of "M" to Al, "R" is at least one organoammonium cation having weighted average valence "p", "r" is the ratio of "R" to Al, "X" is the mole ratio of Si to Al and is generally greater than or equal to 1, and "z" is the mole ratio of O to Al and is given by $$z=(m \cdot n+r \cdot p+3+4 \cdot x)/2.$$

Typical M cations include the alkali and alkaline earth cations Li, Na, K, Rb, Cs, Mg, Ca, Sr and Ba, as well as protons and ammonium cations, $H^+$ and $NH_4^+$. Typical R organoammonium cations include quaternary ammonium cations such as diethyldimethylammonium, tetraethylammonium, tetramethylammonium, or protonated amines such as dimethylethylammonium, $NMe_2EtH^+$, or diethylammonium, $NEt_2H_2^+$. Both the M and R cations are loosely bound to the structure and frequently can be completely or partially replaced with other cations by conventional ion exchange techniques. In the case of many R organoammonium cations, the species are too large to be removed by ion-exchange and calcinations or ammonia calcinations may be required to decompose the organic cation to form smaller protons or ammonium cations that more readily engage in ion-exchange processes. Currently over 200 species of both naturally occurring and synthetic zeolites are known.

Over the last 15 years at UOP LLC, Des Plaines, Ill., a series of novel zeolites have been developed that have been designated by the name UZM for UOP Zeolitic Material. Many of these materials have been prepared via the Charge Density Mismatch approach, which is disclosed in U.S. Pat. No. 7,578,993, which is incorporated by reference. This synthetic approach has enabled the isolation of zeolites with known framework topology but novel compositions, often higher Si/Al ratios or zeolites with completely new framework topologies. In the following discussion, the framework topologies of zeolites will be referred to by the 3-letter codes assigned to them by the Structure Commission of the International Zeolite Association (IZA). For reference, the frameworks and the codes can be viewed at the IZA website, http://www.iza-structure.org/databases/. UZM-4, disclosed in U.S. Pat. No. 6,419,895, has a high silica composition of the BPH framework topology. UZM-5, disclosed in U.S. Pat. No. 6,613,302, has a novel 2-dimensional framework, while UZM-7, disclosed in U.S. Pat. No. 8,158,104, has an unknown framework topology. UZM-8, disclosed in U.S. Pat. No. 6,756,030 is a layered zeolite, while UZM-9, disclosed in U.S. Pat. No. 6,713,041, is a high silica version of the LTA topology. UZM-10 is a high silica version of the OFF topology, while UZM-12, disclosed in U.S. Pat. No. 7,344,694, is a high silica version of the ERI topology. UZM-14, disclosed in U.S. Pat. No. 7,687,423, is a nanozeolite with the MOR topology; UZM-15, disclosed in U.S. Pat. No. 6,890,511, has an unknown framework topology, while UZM-16, disclosed in U.S. Pat. No. 6,752,980, is related to the OFF topology with some longer range features. UZM-22, disclosed in U.S. Pat. No. 7,744,850, has the MEI topology, while UZM-25, disclosed in U.S. Pat. No. 7,867,474 has the CDO topology. UZM-26, disclosed in U.S. Pat. No. 8,048,403, and UZM-27, disclosed in U.S. Pat. No. 7,575,678, are both new zeolites with currently unknown topologies. UZM-35, disclosed in U.S. Pat. No. 7,922,997, has a topology similar to MSE, and UZM-37, disclosed in U.S. Pat. No. 8,158,105, has a topology similar to MWW. Finally, UZM-45, disclosed in U.S. Pat. No. 8,597,611, has an unknown topology. The contents of these patents and patent applications referring to these UZM zeolites are hereby incorporated by reference. As disclosed in all of the individual patents, all these materials have ion-exchange capabilities. In many cases, this ion-exchange capability is enabled after the removal of organic cations by traditional ion-exchange, calcinations, or ammonia calcinations. Materials with ion-exchange capabilities may be used to remove undesirable metals from an aqueous stream, including soluble heavy metals such as $Pb^{2+}$ and $Hg^{2+}$. Applicants have found that the above mentioned UZM zeolites are effective for removing $Hg^{2+}$ from aqueous streams.

Zeolites have previously been used to remediate $Hg^{2+}$-containing aqueous streams. The use of natural zeolites is economically attractive for waste stream remediation. Ukrainian clinoptilolite has been used to remediate the $Hg^{2+}$ waste stream from a Polish copper smelter, taking the effluent from 11 ppb to below 3 ppb as required by Polish law (See A. Chojnacki et al., MINERALS ENGINEERING (2004) 17, pp. 933-937.) However, less than 75% of the $Hg^{2+}$ was removed in this instance. Another study of heavy metals removal using clinoptilolite showed that among the heavy metals, the selectivity for $Hg^{2+}$ was the poorest (See JOURNAL OF HAZARDOUS MATERIALS, B97, (2003) pp. 219-243). Volcanic ash containing zeolites, known as green tuff, has been used as an agriculturally benign approach to remove heavy metals from aqueous streams (See JP 62059519A). An EPA study of $Hg^{2+}$ removal looking at Y, Beta, FER, and MFI zeolites showed that a maximum of 75% of the $Hg^{2+}$ could be removed from 10 ppm $Hg^{2+}$ solutions, using large excesses of zeolite (10 ml solution/g zeolite), indicating a lack of selectivity (See S. Shevade, Mercury in the Environment: Managing and Assessing Multimedia Risks; Division of Environmental Chemistry, American Chemical Society, Preprints of extended abstracts, vol 42, No. 1, 851 (2002)). In US 20050181931, a zeolite-activated carbon composite is disclosed for water purification in which the zeolite may be pre-exchanged with some $Ca^{2+}$ or $Mg^{2+}$. The application claims the use of 4A, X and Y zeolites for this application to remove heavy metals, including $Hg^{2+}$. Another study, citing the generally poor affinity of zeolites for $Hg^{2+}$, treated natural clinoptilolite with the S-containing species cystamine and cysteamine in order to increase $Hg^{2+}$ uptake, observing an improvement (See T. Gebremedhin-Haile et al., Water, Air and Soil Pollution, (2003) 148, pp. 179-200).

In contrast to the $Hg^{2+}$ remediation efforts previously disclosed, applicants disclose a process for removing $Hg^{2+}$ from an aqueous solution via ion-exchange using the zeolites of the UZM group enumerated above. High ion-exchange capacity is desirable for an ion-exchange material and for zeolites, this would point to highly charged, low Si/Al ratio species like 4A and X (Si/Al=1). Such zeolites are known to be very selective for $Mg^{2+}$ and $Ca^{2+}$, common constituents in water, which could interfere with or block the uptake of $Hg^{2+}$. The UZM group of zeolites enumerated above fall into an intermediate range of Si/Al ratios between about 2-20 and usually 3-10. Applicants demonstrate that this UZM group of zeolites has appreciable capability for the uptake of $Hg^{2+}$, much higher than high ion-exchange capacity zeolites.

SUMMARY OF THE INVENTION

This invention relates to a process for purifying a $Hg^{2+}$-containing aqueous waste streams using UOP Zeolitic Materials. One specific embodiment is a process for removing the $Hg^{2+}$ contaminant from a liquid stream comprising contacting the stream with a molecular sieve for a time sufficient to adsorb the metal contaminant onto the molecular sieve, the molecular sieve characterized in that it is one of the following UOP Zeolitic Materials described in Table 1.

TABLE 1

| UOP Zeolitic Material | US Patent/Description |
|---|---|
| UZM-4 | U.S. Pat. No. 6,419,895 |
| UZM-5 | U.S. Pat. No. 6,613,302 |
| UZM-7 | U.S. Pat. No. 8,158,104 |
| UZM-8 | U.S. Pat. No. 6,756,030 |
| UZM-9 | U.S. Pat. No. 6,713,041 |
| UZM-10 | OFF topology, Si/Al > 4 |
| UZM-12 | U.S. Pat. No. 7,344,694 |
| UZM-14 | U.S. Pat. No. 7,687,423 |
| UZM-15 | U.S. Pat. No. 6,890,511 |
| UZM-16 | U.S. Pat. No. 6,752,980 |
| UZM-22 | U.S. Pat. No. 7,744,850 |
| UZM-25 | U.S. Pat. No. 7,867,474 |
| UZM-26 | U.S. Pat. No. 8,048,403 |
| UZM-27 | U.S. Pat. No. 7,575,678 |
| UZM-35 | U.S. Pat. No. 7,922,997 |
| UZM-37 | U.S. Pat. No. 8,158,105 |
| UZM-45 | U.S. Pat. No. 8,597,611 |
| Synthesis of UZMs by Charge Density Mismatch Approach | U.S. Pat. No. 7,578,993 |

The UOP Zeolitic Materials listed above can be converted to an appropriate form for use in $Hg^{2+}$ uptake via ion-exchange, calcinations, or ammonia calcinations or combinations of these processes.

This and other objects and embodiments of the invention will become more apparent after a more detailed description of the invention.

DETAILED DESCRIPTION OF THE INVENTION

One embodiment of the present invention is the removal of $Hg^{2+}$ from aqueous streams via ion-exchange using the UZMs enumerated and described by the patents in Table 1, which are incorporated by reference.

The as-synthesized UZM zeolites may be described by the general formulation $$M_m^{n+}R_r^{p+}AlSi_xO_z$$

where "M" is at least one metal cation having the weighted average valence "n", "m" is the mole ratio of "M" to Al, "R" is at least one organoammonium cation having weighted average valence "p", "r" is the ratio of "R" to Al, "X" is the mole ratio of Si to Al and is generally greater than or equal to 1, and "z" is the mole ratio of O to Al and is given by $$z=(m \cdot n + r \cdot p + 3 + 4 \cdot x)/2.$$

When M is only one metal, then the weighted average valence is the valence of that one metal, i.e. +1 or +2. However, when more than one M metal is present, the total amount of:

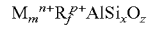

$$M_m^{n+}=M_{m1}^{(n1)+}+M_{m2}^{(n2)+}+M_{m3}^{(n3)+}+\ldots$$

and the weighted average valence n is given by the equation:

$$n = \frac{m_1 \cdot n_1 + m_2 \cdot n_2 + m_3 \cdot n_3 + \ldots}{m_1 + m_2 + m_3 \ldots}$$

Similarly when only one R organic cation is present, the weighted average valence is the valence of the single R cation, i.e., +1 or +2. When more than one R cation is present, the total amount of R is given by the equation:

$$R_r^{p+}=R_{r1}^{(p1)+}+R_{r2}^{(p2)+}+R_{r3}^{(p3)+}+\ldots$$

and the weighted average valence p is given by the equation:

$$p = \frac{p_1 \cdot r_1 + p_2 \cdot r_2 + p_3 \cdot r_3 + \ldots}{r_1 + r_2 + r_3 + \ldots}$$

The compositions, including the identities of R and M and the ranges of m, n, r, and p, vary for the individual UZM species which may be employed in this $Hg^{2+}$ removal application are given in the appropriate patents listed in Table 1. Likewise, the ranges on the compositions and conditions employed in the syntheses of the individual UZM species which may be used for this $Hg^{2+}$ remediation application are given in the appropriate patents in Table 1. A preferred approach to make the individual UZM species which may be used in this application, the Charge Density Mismatch approach, is disclosed in U.S. Pat. No. 7,578,993.

Typically, the as-synthesized UZM species described above are often not ready for ion-exchange applications, because they contain organoammonium cations, R, which are often not exchangeable and block the pores. The as-synthesized zeolite may be made ready for the ion-exchange application by the removal of the organoammonium cations by calcinations, which converts the organoammonium cation to a proton, or ammonia calcinations, which convert the organoammonium cations to ammonium cations. Typical conditions for calcination include heating to 400° to 600° C. for 4 to 24 hours in dry nitrogen or dry air atmospheres. Details for the calcinations of the various UZM may be found in the appropriate patents in Table 1. Typical conditions for ammonia calcinations include the use of gaseous anhydrous ammonia flowing at a rate of 1.1 l/min while ramping the sample at 2° to 5° C./min to 400° to 600° C. and holding at that temperature for a time ranging from 5 minutes to 4 hours. Following the removal of the R organoammonium cation by these methods, the resulting calcined UZM species may be used directly for the $Hg^{2+}$ removal application or they may be ion-exchanged further with another metal that may be favorable for the $Hg^{2+}$ removal application, for example, $Na^+$ or $NH_4^+$.

Other modifications may be applied to the as-synthesized UZM species of Table 1 to obtain the desired ion-exchanger for $Hg^{2+}$ remediation. U.S. Pat. No. 6,776,975B1 discloses modifications that include calcination, ion exchange, various acid extractions, steaming, ammonium hexafluorosilicate treatment, or any combination thereof, as outlined for UZM-4 and is incorporated by reference. Properties that are affected by this treatment include porosity, Si/Al ratio and ultimately the ion-exchange capacity of the UZM species.

The resulting crystalline UZM-species are capable of selective ion exchange of $Hg^{2+}$ ions from liquid streams, such as aqueous streams, thereby removing these metals from the liquid streams. The $Hg^{2+}$ ions can be removed from the liquid stream by contacting the stream with the UZM species for a time sufficient to remove the metal ions and trap them on the molecular sieve. The contacting can be carried out either in a batch mode or in a continuous mode. In a batch mode, the desired molecular sieve is placed in an appropriate container and the stream to be treated mixed therewith. Contacting is carried out for a time of about 0.1 to about 100 hr. In a continuous mode, the molecular sieve is placed in a column and the stream to be treated is flowed through it, usually downflow, until the contaminant metal is detected in the effluent of the column.

Additionally, as stated above, the UZM-species can be exchanged with a different cation prior to its use in an ion exchange process. The criteria for choosing the cation are: 1) compatibility with the solution to be treated and 2) the relative ion exchange selectivities of the cation versus the $Hg^{2+}$ ion to be removed. Such modifications of molecular sieves are well known in the art. For example, if the UZM-species is synthesized in the potassium form and the stream contains sodium ions in addition to $Hg^{2+}$ contaminant ions, the potassium ion should preferably be exchanged with sodium ions prior to using the molecular sieve to remove contaminants in order to prevent adding potassium ions to the treated stream.

In order to more fully illustrate the instant invention, the following examples are set forth. It is to be understood that the examples are only by way of illustration and are not intended as an undue limitation on the broad scope of the invention as set forth in the appended claims.

Examples 1-9

Synthesis of the UZM Materials Tested for $Hg^{2+}$ Removal

Example 1

UZM-4 (3.74)

An aluminosilicate solution was prepared by first mixing 51.96 g of $Al(OH)_3$ (26.9% Al) with 844.72 g ethyltrimethylammonium hydroxide (20%) and 137.78 g choline hydroxide (47.1%) while stirring vigorously. Ludox AS-40 colloidal silica (40% $SiO_2$), 400.0 g, is added. The reaction mixture is homogenized for an hour with a high speed mechanical stirrer, transferred to Teflon bottles, and digested at 100° C. for 18 hours. The resulting aluminosilicate solution consisted of 5.44 wt % Si and 1.03 wt % Al, yielding Si/Al=5.07.

A portion of this solution, 230 g, is placed under a high speed mechanical stirrer and with continuous stirring. A combined solution of 16.16 g $LiCl*9 H_2O$ with 7.53 g. $Sr(NO_3)_2*20 H_2O$ is added dropwise. The reaction mixture is homogenized for 1 hour flowing the addition. A portion of the reaction mixture was aged at room temperature for 18 days before it was digested for 6 days at 115° C. The solid product was recovered by centrifugation, washed with de-ionized water and dried at 95° C. The product was identified as UZM-4 by xrd. The composition of the product consisted of the following mole ratios: Si/Al=3.74, Li/Al=0.65, Sr/Al=0.17, C/N=4.80, N/Al=0.62. This material was calcined under flowing air at 550° for 6 hours and a portion subsequently ion exchanged twice with 1 M $NH_4NO_3$ at 75° for an hour, providing the ammonium form of the UZM-4 zeolite for testing.

Example 2

UZM-4 (3.81)

An aluminosilicate solution was prepared by combining 32.53 g $Al(OH)_3$ (26.9% Al) and 575.67 g DEDMAOH (20% aq) with overhead stirring. After 1 hour of vigorous stirring, 241.80 g Ludox AS-40 colloidal silica (40% $SiO_2$) was added and allowed to mix an additional 1.5 hours. The clear solution was aged at 100° C. for about 2 days. At a later time, to 188.48 g portion of this 4.75 Si/Al ratio aluminosilicate solution, an additional 84.94 g of DEDMAOH (20 wt. %) was added with overhead stirring creating a $OH^-/Si=0.90$ ratio clear solution. With continued vigorous stirring, a solution prepared by dissolving 1.18 g LiCl, and 2.96 g $Sr(NO_3)_2$ in 15 g deionized $H_2O$ was added via a single pour and allowed to mix for an additional 1.5 hours creating an opaque suspension. Total water content was reduced to 10 $H_2O$/Si via roto-evaporation and the translucent gel was digested in a static autoclave at 125° C. for 90 hours. The solid product was isolated by centrifugation, washed with deionized water and dried at room temperature. The product was identified as UZM-4 via x-ray diffraction. The resulting white powder was analyzed by ICP yielding Si/Al=3.81 and ammonium exchanged via a three stage $NH_4NO_3$ exchange at 75° C. for 1.5 hours targeting 1 g zeolite per 1 g $NH_4NO_3$ in a 8 wt. % $NH_4NO_3$ exchange solution, providing the ammonium form of the zeolite for testing.

Example 3

UZM-4 (3.44)

An aluminosilicate solution was made by combining 45.93 g $Al(OH)_3$ (26.9% Al) and 812.71 g DEDMAOH (20% aq.) while stirring vigorously. With continued stirring 341.36 g Ludox AS-40 colloidal silica (40% $SiO_2$) was added and the colloidal solution was allowed to mix for an additional 1.5 hours. The solution was then aged at 100° C. for about 2 days until clear. At a later time, a 336.72 g portion of this aluminosilicate solution was treated with an additional 160.67 g DEDMAOH (20 wt. %) with overhead stirring. Separately, a solution was prepared by dissolving 1.43 g LiCl, and 3.57 g $Sr(NO_3)_2$ in 25 g deionized $H_2O$ and added to the reaction mixture via a single pour, creating an opaque suspension that was allowed to stir for an additional 1.5 hours. Excess water was removed to $H_2O/Si=10$ via roto-evaporation. The non-transparent medium viscosity gel was then digested quiescently in an autoclave at 150° C. for 3 days. The product was identified as UZM-4 by powder x-ray diffraction. The resulting powder was isolated by centrifugation, washed with deionized water, and dried at room temperature. The product was identified as UZM-4 via powder x-ray diffraction and analysis by ICP yielded Si/Al=3.44. The product was ammonium ion exchanged via a three stage $NH_4NO_3$ exchange carried out at 75° C. for 1.5 hours, targeting 1 g zeolite per 1 g $NH_4NO_3$ in a 8 wt. % $NH_4NO_3$ exchange solution, providing the ammonium form of the zeolite for testing.

Example 4

UZM-4 (2.11)

An aluminosilicate solution was made by combining 35.35 g $Al(OH)_3$ (26.9% Al) and 551.93 g ETMAOH (20% aq.) with a high speed overhead stirrer. After 25 minutes stirring, 262.72 g Ludox AS-40 (colloidal silica, 40% $SiO_2$) was added creating a translucent solution that was then left to mix for an additional 40 minutes. The aluminosilicate reaction mixture was then aged at 100° C. for about 2 days to form a clear solution. At a later time, a 313.70 g portion of this Si/Al=4.83 solution was combined with an additional 150.41 g ETMAOH (20% aq.) and mixed for 20 minutes with an overhead stirrer. With continued overhead stirring a solution of 5.33 g KCl dissolved in 25 g $H_2O$ was added via single pour resulting in a clear solution. After additional homogenization for 45 minutes, excess water was removed to $H_2O/Si=10$ via roto-evaporation. The clear gel was sealed in an autoclave and digested quiescently at 100° C. for 12 days. The product was isolated by centrifugation, washed with deionized water and dried at room temperature. The product was identified as UZM-4 by powder x-ray diffraction. Analysis by ICP yielded Si/Al=2.11. A portion of the solid was ammonium exchanged via a three stage $NH_4NO_3$ exchange at 75° C. for 1.5 hours targeting 1 g zeolite per 1 g $NH_4NO_3$ in a 8 wt. % $NH_4NO_3$ exchange solution, providing the ammonium form of the zeolite for the test.

Example 5

UZM-5

In a 4-liter beaker 244.3 gram of $Al(OH)_3$ (26.9% Al) is dissolved in 3133.2 g of TEAOH (35%) while mixing with a mechanical mixer for 15 minutes and added to the make-up tank of a 19 liter (5 gallon) reactor. Next, 3023.0 g of Ludox AS-40 colloidal silica (40% $SiO_2$) is added to the TEAOH-Al solution, the reaction is stirred for 30 minutes, followed by the addition of 6000 g deionized water. The reaction mixture was pumped into the 19 liter (5 gallon) reactor and heated at 95° C. for 24 hours with stirring. The resulting aluminosilicate solution was then cooled to 80° C. and transferred to the make-up tank. Separately, 50.31 g of NaOH (99%) and 230.24 g of TMAOH*5$H_2O$ (50% TMAOH solid) was dissolved in 1318 grams of deionized water. This TMAOH-NaOH solution is then quickly added to the TEA-Al—Si solution and stirred for 10 minutes in the make-up tank. The reaction mixture was then transferred to the 19 liter (5 gallon) reactor and digested for 145 hours at 125° C. while stirring at 150 rpm. The final product was isolated by filtration, washed with de-ionized water and dried at 100° C. The product was identified as UZM-5 via powder x-ray diffraction. Elemental analysis showed the Si/Al ratio to be 5.69. The UZM-5 was calcined using the following program: Ramped 1° C./min to 350° C. in flowing dry $N_2$, dwell 1 hour, ramp 1° C./min to 525° C., dwell 1 hour, switch atmosphere to flowing dry air, dwell for 5 hours, return to room temperature. The calcined material was ion-exchanged using 100 g UZM-5, 100 g $NH_4NO_3$, 1000 g de-ionized water, stirring for 3 hours at 75° C., carried out 3 times. The ammonium form of the zeolite was used in testing.

Example 6

UZM-10

An aluminosilicate solution was prepared by first mixing 16.4 g of aluminum tri-sec-butoxide, (95%) with 168.08 g tetraethylammonium hydroxide (35%). While stirring vigorously 3.76 g tetramethylammonium chloride, 97% is added directly. Then 100.0 g colloidal silica, Ludox AS-40 (40% $SiO_2$) is added. The reaction mixture is homogenized for an hour with a high speed mechanical stirrer and 85 g de-ionized water is added. The mixture is then transferred to a Teflon bottle, which is placed in a 95° C. oven for 18 hours. A portion of the resulting aluminosilicate solution, 175.05 g, is placed under a high speed mechanical stirrer. With continuous stirring a solution consisting of 1.24 g potassium chloride dissolved in 4.2 g deionized water is added dropwise. The resulting mixture is homogenized for 1 hour. The reaction mixture was then distributed among several Teflon-lined autoclaves and digested at a variety of temperatures and times quiescently, at autogenous pressures. The solid products were recovered by centrifugation, washed with de-ionized water and dried at 95° C. The products from the autoclaves digested at 135° C. for 4 days were identified as UZM-10 by powder x-ray diffraction. Elemental analysis showed the product to consist of the following mole ratios: Si/Al=6.13, K/Al=0.31, C/N=5.76, N/Al=0.87. This product is calcined under flowing air at 600° for 4 hours. This calcined product, 1.23 g, was twice ion exchanged with 1 M $NH_4NO_3$ at 75° for an hour. The ammonium form of the zeolite was presented for testing.

Example 7

UZM-9

An aluminosilicate reaction mixture was prepared by adding 530 g of $Al(OH)_3$ to 4477 g TEAOH (35%), 2697 g de-ionized water and 4324 g of DEDMAOH (20%) with vigorous stirring. This was followed by the addition of 3302 g Hi-Sil 250 (88%) silica. Then a solution containing 547.98 g TMAOH*5 $H_2O$ and 120.91 g NaOH dissolved in 1000 g distilled water was prepared and added slowly to the aluminosilicate concoction with mixing. The mixture was homogenized for 60 minutes with a high-speed stirrer. Then 314 g of UZM-9 seeds was added. The mixture was crystallized at 105° C. for 10 days in a 19 liter (5 gallon) stirred reactor. The solid products were isolated by filtration, washed with de-ionized water, and dried at 95° C. The product was identified as UZM-9 by powder x-ray diffraction. The composition of the UZM-9 product exhibited the following mole ratios as determined by elemental analysis: Si/Al=5.19, Na/Al=0.34, N/Al=0.66. A portion of the product was calcined under a flow of air for 6 hr at 600° C. The calcined UZM-9 was ion-exchanged using a solution of 1M $NH_4NO_3$ at 75° C. for 1.5 hrs. The slurry was filtered and the solid washed with de-ionized water. This procedure was repeated 3 times. The final composition of the NH$_4$-UZM-9 was Si/Al=5.5, Na/Al=0.001. The ammonium form of the zeolite was used in testing.

Example 8

UZM-10

An aluminosilicate solution was prepared by first mixing 13.88 g of aluminum isopropoxide (98%) with 420.24 g tetraethylammonium hydroxide (35%). While stirring vigorously, 7.52 g tetramethylammonium chloride (97%) is added directly. Then 200.0 g colloidal silica, Ludox AS-40 (40% SiO$_2$) is added. The reaction mixture is homogenized for an hour with a high speed mechanical stirrer. The mixture is then transferred to a Teflon bottle, which is placed in a 100° C. oven for 18 hours. A portion of the resulting aluminosilicate solution, 128.33 g, is placed under a high speed mechanical stirrer. With continuous stirring, a solution consisting of 0.50 g potassium chloride dissolved in 3.0 g de-ionized water is added dropwise. The reaction mixture is homogenized for 1 hour. The mixture is then distributed among several Teflon-lined autoclaves which were digested quiescently at autogenous pressures at 125° C. The solid products were recovered by centrifugation, washed with de-ionized water and dried at 95° C. The product resulting from a 5 day digestion was identified as UZM-10 by powder x-ray diffraction. Elemental analysis showed the product to consist of the following mole ratios: Si/Al=7.11, K/Al=0.34, C/N=6.21, N/Al=1.22. This product was calcined under flowing air at 550° for 6 hours. Later, 0.63 g of the calcined material was twice ion exchanged with 1 M NH$_4$NO$_3$ at 75° for an hour. The ammonium form of the zeolite was used in testing.

Example 9

UZM-12

An aluminosilicate solution was prepared by dissolving 734.4 g Al(Osec-Bu)$_3$ (97%) in 5840.3 g TEAOH (35%) in the 19 liter (5 gallon) make-up tank. To this, 3473.3 g colloidal silica (Ludox AS-40, 40% SiO$_2$) was added. The reaction mixture was stirred in the make-up tank for 20 minutes before it was transferred to the 19 liter (5 gallon) reactor. The reaction mixture was brought to a temperature of 98° C. over a period of two hours and then digested at that temperature for 18 hours. The resulting aluminosilicate solution was then cooled to 50° C. and transferred back to the make-up tank. Separately, a solution was prepared by dissolving 1047.5 g hexamethonium bromide in 2000 g de-ionized water. Another solution was prepared by dissolving 344.1 g KBr in 558.9 g de-ionized water. The hexamethonium bromide and potassium bromide solutions were combined to form a single solution. This combined solution was added to the aluminosilicate solution in the make-up tank with vigorous stirring and was further homogenized for 30 minutes post addition. The reaction mixture was then transferred back to the 19 liter (5 gallon) reactor, where it was heated to 125° C. over a two hour period and digested at that temperature for 76 hours. The products were isolated by centrifugation and washed with de-ionized water. The product was confirmed to be UZM-12 by powder x-ray diffraction. A portion of the product was calcined in flowing dry air with a temperature profile consisting of ramping the material to 350° C. at 1° C./min, dwelling at 350° C. for 1 hour, ramping further to 550° C. at 1° C./min, dwelling for 5 hours, before allowing the material to cool to 100° C. A portion of the calcined material was ion-exchanged 4 times using a solution that was 10% by weight each of zeolite and NH$_4$NO$_3$, stirring the suspension at 70° C. for 3 hours each time. Elemental analysis showed the composition to consist of the following mole ratios: Si/Al=6.31 and K/Al=0.19. The ammonium form of the zeolite was used in testing.

Example 10

The samples from of Examples 1-9 were tested to determined its ability to adsorb Hg$^{2+}$, Mg$^{2+}$ and Ca$^{2+}$ by determining its distribution coefficients ($K_d$) for each of the metals as follows.

The typical Hg$^{2+}$ test solution was prepared by dissolving 44.4 mg of mercuric acetate in 999.54 g tap water inside a 1000 ml polypropylene bottle. The solution was allowed to stand for a few days to check for stability before a small portion was sent for chemical analysis. This solution contained about 27 ppm Hg$^{2+}$, 31 ppm Ca$^{2+}$ and 10 ppm Mg$^{2+}$, other test solutions contained comparable amounts of the cations in the ranges of 27 to 30 ppm Hg$^{2+}$, 30 to 34 ppm Ca$^{2+}$, and 10 to 11 ppm Mg$^{2+}$. For the test, 200 mg of ion-exchanger is placed in a 30 ml borosilicate vial to which 20 ml of Hg(OAc)2 test solution is added using a 20 ml syringe. The loaded vial is sealed with a cap and placed in a Bohdan shaker and shaken vigorously for 24 hours at room temperature. Once the ion exchanger has been contacted with the Hg$^{2+}$ solution for the desired amount of time, the solution/solid suspension is removed from the vial using a syringe. Solids were separated from the solution by pushing the syringe contents through a 0.45 um Nylon filter. Solution was collected in a plastic vial and sent for chemical analysis via ICP. Detection levels for Hg, Ca, and Mg were 100 ppb, 80 ppb and 20-80 ppb respectively.

The $K_d$ value was calculated using the following formula:

$$K_d(\text{mL/g}) = \frac{(V)(Ac)}{(W)(Sc)} 1$$

where:
V=volume of waste simulant (mL)
Ac=concentration of cation absorbed on ion-exchanger (g/mL)
W=mass of ion-exchanger evaluated (g)
Sc=concentration of cation in post reaction supernate (g/mL)

Initially, samples of UZM-4 and UZM-5 were tested along with two standard zeolites of high ion-exchange capacity, zeolite 4A (LTA topology, Si/Al=1) and zeolite X (FAU topology, Si/Al=1. The results are shown in Table 2 below.

TABLE 2

| Sample | Hg $K_d$ | Ca $K_d$ | Mg $K_d$ | Si/Al |
|---|---|---|---|---|
| 4A | 23 | 6308 | 52400 | 1 |
| X | 59 | 5507 | 34900 | 1 |
| UZM-4 | 6448 | 12700 | >10400 | 1.83 |
| Ex. 5, UZM-5 | 3295 | 264 | 316 | 5.69 |

It is seen that the zeolites with the highest ion-exchange capacity, 4A and X zeolites with Si/Al=1, have almost selectivity for Hg$^{2+}$ and in fact the Hg$^{2+}$ prefers to be in solution. They do show excellent affinity for Mg$^{2+}$ and Ca$^{2+}$. The UZM-4 at Si/Al ratio of 1.83, shows a greatly enhanced affinity for Hg$^{2+}$, but also shows good affinity for Ca$^{2+}$ and Mg$^{2+}$. UZM-5 shows selectivity for Hg$^{2+}$ uptake over that of Ca$^{2+}$ and Mg$^{2+}$. This is despite the fact that UZM-5 is structurally related to zeolite 4A, essentially having a 2-dimensional LTA pore system rather than a 3-dimensional pore system and having less than ⅓ of the ion exchange capacity.

Example 11

Further testing on a variety of the UZM zeolites was carried out according to the procedures utilized in Example 10. The resulting distribution coefficients for Hg$^{2+}$, Ca$^{2+}$, and Mg$^{2+}$ are shown below in Table 3.

TABLE 3

| Sample | Hg K$_d$ | Ca K$_d$ | Mg K$_d$ | Si/Al |
|---|---|---|---|---|
| Ex. 2, UZM-4 | 32678 | 15355 | >10400 | 3.81 |
| Ex. 4, UZM-4 | 47481 | 16090 | >10400 | 2.11 |
| Ex. 3, UZM-4 | 40872 | 15355 | >10400 | 3.44 |
| Ex. 1, UZM-4 | 20971 | 10934 | >10400 | 3.74 |
| Ex. 7, UZM-9 | 15426 | 425 | 540 | 5.50 |
| Ex. 9, UZM-12 | 19968 | 712 | 1008 | 6.31 |
| Ex. 6, UZM-10 | 16854 | 967 | 625 | 6.13 |
| Ex. 8, UZM-10 | 5363 | 233 | 210 | 7.11 |

The results show that raising the Si/Al ratio on the UZM-4 to above 2 results in dramatic gains in affinity for Hg$^{2+}$, with K$_d$'s for Hg$^{2+}$ now greater than those observed for Ca$^{2+}$, which was not the case for the UZM-4 with Si/Al=1.83 in Example 10. Among the UZM materials indicated in Table 1, UZM-4 has the lowest Si/Al ratio. In Table 3, one can see that UZM-9, which has the same LTA topology as 4A zeolite and less than one-third of the ion-exchange capacity, shows a complete flip flop in performance compared to 4A zeolite, showing high affinity for Hg$^{2+}$, as well as being selective for Hg$^{2+}$ over Mg$^{2+}$ and Ca$^{2+}$. The UZM-10 and UZM-12 samples also show good affinity for Hg$^{2+}$ and are selective for Hg$^{2+}$ over Ca$^{2+}$ and Mg$^{2+}$.

SPECIFIC EMBODIMENTS

While the following is described in conjunction with specific embodiments, it will be understood that this description is intended to illustrate and not limit the scope of the preceding description and the appended claims.

A first embodiment of the invention is a process for removing Hg$^{2+}$ contaminant from a liquid streams comprising contacting the stream with a molecular sieve for a time sufficient to adsorb the Hg$^{2+}$ contaminant onto the molecular sieve, the molecular sieve characterized in that it comprises one or more zeolitic materials selected from the group consisting of UZM-4, UZM-5, UZM-7, UZM-8, UZM-9, UZM-10, UZM-12, UZM-14, UZM-15, UZM-16, UZM-22, UZM-25, UZM-26, UZM-27, UZM-35, UZM-37 and UZM-45. An embodiment of the invention is one, any or all of prior embodiments in this paragraph up through the first embodiment in this paragraph wherein the metal ion contaminant is Hg$^{2+}$ is removed from a liquid stream also containing Mg$^{2+}$ and Ca$^{2+}$. An embodiment of the invention is one, any or all of prior embodiments in this paragraph up through the first embodiment in this paragraph wherein the process is a batch process. An embodiment of the invention is one, any or all of prior embodiments in this paragraph up through the first embodiment in this paragraph wherein the process is a continuous process. An embodiment of the invention is one, any or all of prior embodiments in this paragraph up through the first embodiment in this paragraph wherein the contacting time is from about 0.1 to about 100 hr. An embodiment of the invention is one, any or all of prior embodiments in this paragraph up through the first embodiment in this paragraph wherein the liquid stream is an aqueous stream. An embodiment of the invention is one, any or all of prior embodiments in this paragraph up through the first embodiment in this paragraph wherein the Hg$^{2+}$ contaminant is present in a concentration of from about 0.002 mg/liter to about 10 mg/liter. An embodiment of the invention is one, any or all of prior embodiments in this paragraph up through the first embodiment in this paragraph wherein the molecular sieve has a Si/Al ratio between about 2 to 20. An embodiment of the invention is one, any or all of prior embodiments in this paragraph up through the first embodiment in this paragraph wherein the molecular sieve as a Si/Al ratio between about 3 and 10. An embodiment of the invention is one, any or all of prior embodiments in this paragraph up through the first embodiment in this paragraph wherein the molecular sieve is modified by a modification selected from the group consisting of calcination, ammonia calcination, and ion-exchange to prepare the molecular sieve for Hg$^{2+}$ uptake.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for removing Hg$^{2+}$ contaminant from a liquid streams comprising contacting the stream with a molecular sieve for a time sufficient to adsorb the Hg$^{2+}$ contaminant onto the molecular sieve, the molecular sieve characterized in that it comprises one or more zeolitic materials selected from the group consisting of UZM-4, UZM-5, UZM-7, UZM-8, UZM-9, UZM-10, UZM-12, UZM-14, UZM-15, UZM-16, UZM-22, UZM-25, UZM-26, UZM-27, UZM-35, UZM-37 and UZM-45.

2. The process of claim 1 wherein the metal ion contaminant is Hg$^{2+}$ is removed from a liquid stream also containing Mg$^{2+}$ and Ca$^{2+}$.

3. The process of claim 1 wherein the process is a batch process.

4. The process of claim 1 wherein the process is a continuous process.

5. The process of claim 3 wherein the contacting time is from about 0.1 to about 100 hours.

6. The process of claim 1 wherein the liquid stream is an aqueous stream.

7. The process of claim 1 wherein the Hg$^{2+}$ contaminant is present in a concentration of from about 0.002 mg/liter to about 10 mg/liter.

8. The process of claim 1 wherein said molecular sieve has a Si/Al ratio between about 2 and 20.

9. The process of claim 1 wherein said molecular sieve has a Si/Al ratio between about 3 and 10.

10. The process of claim 1 wherein the molecular sieve is modified by a modification selected from the group consisting of calcination, ammonia calcination, and ion-exchange to prepare the molecular sieve for Hg$^{2+}$ uptake.

* * * * *